United States Patent
Becoulet et al.

(10) Patent No.: US 12,546,256 B2
(45) Date of Patent: Feb. 10, 2026

(54) TURBINE ENGINE MODULE EQUIPPED WITH AN ELECTRIC MACHINE HAVING A ROTOR DRIVEN IN ROTATION VIA A MOTION TAKE-OFF MECHANISM

(71) Applicant: SAFRAN AIRCRAFT ENGINES, Paris (FR)

(72) Inventors: Julien Fabien Patrick Becoulet, Moissy-Cramayel (FR); Didier Gabriel Bertrand Desombre, Moissy-Cramayel (FR); Matthieu Bruno Francois Foglia, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 165 days.

(21) Appl. No.: 17/905,318

(22) PCT Filed: Mar. 26, 2021

(86) PCT No.: PCT/FR2021/050539
§ 371 (c)(1),
(2) Date: Aug. 30, 2022

(87) PCT Pub. No.: WO2021/198601
PCT Pub. Date: Oct. 7, 2021

(65) Prior Publication Data
US 2023/0313739 A1 Oct. 5, 2023

(30) Foreign Application Priority Data
Apr. 3, 2020 (FR) .................................... 2003359

(51) Int. Cl.
*F01D 15/10* (2006.01)
*F01D 25/16* (2006.01)
(Continued)

(52) U.S. Cl.
CPC ................ *F02C 7/06* (2013.01); *F01D 15/10* (2013.01); *F01D 25/16* (2013.01); *F02C 7/32* (2013.01); *F02K 3/06* (2013.01)

(58) Field of Classification Search
None
See application file for complete search history.

(56) References Cited

U.S. PATENT DOCUMENTS

| 2007/0013261 A1* | 1/2007 | Shichijo | ................. H02K 16/00 310/263 |
| 2008/0098712 A1 | 5/2008 | Sheridan | |

(Continued)

FOREIGN PATENT DOCUMENTS

| EP | 1918564 A2 | 5/2008 |
| EP | 3184780 A1 | 6/2017 |

OTHER PUBLICATIONS

International Search Report received for PCT Patent Application No. PCT/FR2021/050539, mailed on Jul. 6, 2021, 5 pages (2 pages of English Translation and 3 pages of Original Document).

*Primary Examiner* — Gerald L Sung
*Assistant Examiner* — Jacek Lisowski
(74) *Attorney, Agent, or Firm* — WOMBLE BOND DICKINSON (US) LLP

(57) ABSTRACT

The invention relates to a turbine engine module, comprising: —a fan shaft (6), —a power shaft (15) rotating the fan shaft via a speed reducer (21) arranged in a lubrication chamber (22), —a lubrication system (50) for the speed reducer (21) having a main circuit (51), which is closed, for supplying the lubrication chamber, and an auxiliary circuit (60), which is closed, for supplying the lubrication chamber when the main circuit is inactive, the auxiliary circuit comprising an auxiliary pump (61) driven by an electric motor (63), and —an electric machine (65) configured to power the electric motor (63), the electric machine having a (Continued)

rotor connected to the fan shaft in order to be rotated and a stator mounted on a stationary member at least partially supporting the electric machine.

23 Claims, 3 Drawing Sheets

(51) Int. Cl.
*F02C 7/06* (2006.01)
*F02C 7/32* (2006.01)
*F02K 3/06* (2006.01)

(56) References Cited

U.S. PATENT DOCUMENTS

| | | | |
|---|---|---|---|
| 2014/0291987 A1* | 10/2014 | Dooley | H02K 16/04 |
| | | | 290/34 |
| 2016/0258324 A1 | 9/2016 | Cigal et al. | |
| 2017/0175874 A1 | 6/2017 | Schwarz et al. | |
| 2018/0354631 A1* | 12/2018 | Adibhatla | B64D 35/08 |
| 2018/0370641 A1* | 12/2018 | Dindar | H02K 7/1823 |
| 2019/0284992 A1* | 9/2019 | Hoke | F02B 39/10 |
| 2019/0368380 A1* | 12/2019 | Manzoni | F02C 7/06 |
| 2020/0063606 A1* | 2/2020 | Miller | B64D 27/10 |
| 2020/0102914 A1* | 4/2020 | Moss | F01D 15/10 |

\* cited by examiner

TURBINE ENGINE MODULE EQUIPPED WITH AN ELECTRIC MACHINE HAVING A ROTOR DRIVEN IN ROTATION VIA A MOTION TAKE-OFF MECHANISM

TECHNICAL FIELD OF THE INVENTION

The present invention relates to the field of the turbine engines equipped with reducer. It is aimed in particular at a turbine engine module equipped with an electric machine intended to supply an auxiliary pump of a lubrication system of at least one equipment of the turbine engine and the corresponding turbine engine.

PRIOR ART

An aircraft turbine engine, such as a double-flow turbine engine, generally comprises a ducted fan arranged at the inlet of the turbine engine and which is driven in rotation by a low-pressure shaft. A reducer can be interposed between the fan and the low-pressure shaft so that the fan rotates at a lower speed than that of the low-pressure shaft. The reduction in speed also allows the size of the fan to be increased allowing so that very high bypass ratio can be achieved.

The reducers (also known as "Reduction Gear Box" or RGB) are of the planetary or epicyclic type. They are usually equipped with several rotating gear wheels and/or sprockets whose lubrication and cooling in all circumstances are essential aspects for the proper operation of the turbine engine and its efficiency. Indeed, when the speed reducer is not sufficiently lubricated, the friction between the teeth of the gear wheels and/or sprockets or at the level of the bearings leads to their premature wear and thus to a decrease in the efficiency of the speed reducer. These bearings, gear wheels and/or sprockets of the speed reducers can generate a very high thermal power which must be evacuated to avoid damage to the speed reducer.

Lubrication systems are known to lubricate certain members of the turbine engine, in particular the speed reducer such as in the documents US-A1-2016/258324 and EP-A1-3184780.

Some lubrication systems are designed to send a large flow rate of oil that can reach several thousand litres per hour, for example more than 5000 litres per hour depending on the architecture of the turbine engine to lubricate the speed reducer and the bearings. The lubrication systems generally comprise a main circuit comprising at least one tank and a main pump, which is intended to supply a lubrication enclosure in which the reducer and the bearings are arranged. The main pump is mechanically driven by the high-pressure shaft of the turbine engine via an accessory gear box. In this case, the main circuit allows the lubrication and the cooling of the reducer and bearings only when the high-pressure shaft is running, i.e., when the turbine engine has already started and is in flight. The lubrication system also comprises an auxiliary circuit, with an auxiliary tank and an auxiliary pump, to cover the other cases of operation of the turbine engine, i.e., during the start-up phase, or during the shutdown phase, or when the fan shaft rotates freely thanks to the action of the wind and drives in rotation the low-pressure shaft to which it is coupled. This last case is known as "Wind Milling". There is a mechanical solution where the auxiliary pump is driven by the reducer and where the operation must be adapted with adequate members in all cases of rotation of the fan in Wind Milling (clockwise and counter clockwise). This mechanical pump is relatively complicated to mount and is bulky. On the other hand, the mechanical pump operates continuously, which leads to a premature wear thereof and it is necessary to implement a specific technology so that it can turn in both directions in the Wind Milling case. There is an electric solution where the auxiliary pump is powered by an external power source of the lubrication enclosure such as a battery which penalizes the mass of the turbine engine.

SUMMARY OF THE INVENTION

In particular, the objective of the present invention is in particular to provide a solution allowing for autonomously supplying the auxiliary pump of a lubrication system while avoiding penalizing the mass of the turbine engine and facilitating the mounting and the dismounting of the members of the turbine engine.

We achieve this objective, in accordance with the invention, by means of a turbine engine module comprising:
- a fan shaft guided in rotation about a longitudinal axis X by at least one first guide bearing mounted on a first bearing support which is attached to a stationary structure of the turbine engine,
- a power shaft driving the fan shaft in rotation by means of a speed reducer arranged in a lubrication enclosure of the turbine engine,
- a lubrication system for at least the speed reducer comprising a main, closed circuit, intended to supply the lubrication enclosure, and an auxiliary, closed circuit, intended to supply the lubrication enclosure when the main circuit is inactive, the auxiliary circuit comprising at least one auxiliary supply pump driven by an electric motor,
- the module further comprising an electric machine configured so as to power the electric motor of the auxiliary pump and which is carried at least partly by the first bearing support, the electric machine comprising a rotor connected to the fan shaft so as to be driven in rotation about an axis of rotation A parallel to the longitudinal axis X and a stator mounted on a stationary element supporting at least partly the electric machine.

Thus, this solution allows to achieve the above-mentioned objective. In particular, thanks to the connection of the rotor of the electric machine with the fan shaft, the auxiliary pump of the lubrication system is directly supplied to allow the circulation of the lubricant in the auxiliary circuit intended to supply the lubrication enclosure, in particular when the main pump is inactive. The main pump only operates when the high-pressure shaft is rotating at a predetermined speed, while the fan shaft is driven in rotation by the wind (Wind Milling) when the aircraft is on the ground and when the turbine engine is stopped, when the machine is started or ventilated. The electric machine takes advantage of the rotation of the fan shaft in different cases so that the rotor of the electric machine is then also driven in rotation in all operating cases to generate electrical power that can be used to power various equipment in the turbine engine. The lubrication system and the electric machine are then autonomous. In addition, this configuration is modular, which allows for easy dismounting and mounting from the upstream of the turbine engine.

The fan module also comprises one or more of the following characteristics, taken alone or in combination:
- the fan module comprises a motion take-off mechanism configured so as to connect the rotor of the electric machine to the fan shaft and to transmit the motion from the fan shaft to the rotor. Such a configuration allows the electric machine to be moved away from the gears of the speed reducer to limit oil splashes on the electric elements.

the motion take-off mechanism comprises a gear train.

the electric machine comprises a motion take-off mechanism connecting the rotor to the fan shaft, the motion take-off mechanism comprising a drive shaft mounted to rotate freely about the axis of rotation A and on which the rotor is mounted, the drive shaft being coupled to a toothed wheel intended to mesh with a toothed ring gear secured to the fan shaft.

the drive shaft is guided in rotation by a first rotor bearing comprising a first ring secured to the drive shaft and a second ring secured to the stationary element, the first rotor bearing being arranged upstream of the rotor of the electric machine.

the drive shaft is guided in rotation by a second rotor bearing comprising a first ring secured to the drive shaft and a second ring secured to the stationary element, the second rotor bearing being arranged downstream of the rotor of the electric machine.

the electric machine is arranged upstream of the speed reducer in relation to the longitudinal axis and at least partly in the lubrication enclosure.

the electric machine is housed in a case formed in the first bearing support.

the stationary element is a basement of the electric machine mounted on the first bearing support or the stationary element is the first bearing support.

the drive shaft is integral with the toothed wheel.

the stator of the electric machine extends around the rotor of the electric machine.

an electric cable is connected to the electric machine and the electric motor, the electric cable circulating outside the lubrication enclosure.

the speed reducer is of the planetary gear type, the speed reducer comprising a sun gear mounted movable about an axis X and coupled to the power shaft, and a ring gear centred on the longitudinal axis coupled to the fan shaft, the reducer further comprising a planet carrier which is stationary and which carries a plurality of movable planet gears meshing with the ring gear and the sun gear.

the speed reducer is of the epicyclic gear train type, the speed reducer comprising a sun gear mounted movable about an axis X and coupled to the power shaft, a stationary ring gear and a planet carrier centred on the longitudinal axis which is coupled to the fan shaft and which carries a plurality of movable planet gears meshing with the ring gear and the sun gear.

the toothed wheel and the ring gear are housed in the lubrication enclosure.

the stationary element comprises the case of the electric machine.

the auxiliary pump which is installed outside the lubrication enclosure.

The invention also relates to an aircraft turbine engine comprising a turbine engine module having any of the foregoing characteristics.

The invention also relates to a method for assembling a turbine engine module as above-mentioned and comprises the following steps:

mounting the toothed ring gear on the fan shaft, assembling the electric machine by mounting the rotor on a drive shaft and the stator on the stationary element supporting at least partly the electric machine, attaching the basement of the electric machine to the first bearing support in such a way that the rotor and the stator are arranged in the case of the first bearing support which is open in the lubrication enclosure, and connecting the electric cable to the electric machine and to the auxiliary pump which is installed outside the lubrication enclosure.

The assembly method comprises the following characteristics and/or steps, taken alone or in combination:

the stationary element supporting at least partly the electric machine comprises the basement of the electric machine or the first bearing support, mounting a first guide bearing support for the fan shaft on a stationary structure of the turbine engine.

assembling the electric machine by mounting the stator on the first bearing support.

making the meshing of the toothed wheel coupled to the drive shaft with the toothed ring gear.

assembling the speed reducer.

mounting the speed reducer in the lubrication enclosure of the turbine engine.

connecting a fan disc to the fan shaft.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the following attached figures.

DETAILED DESCRIPTION OF THE INVENTION

Figure 1:
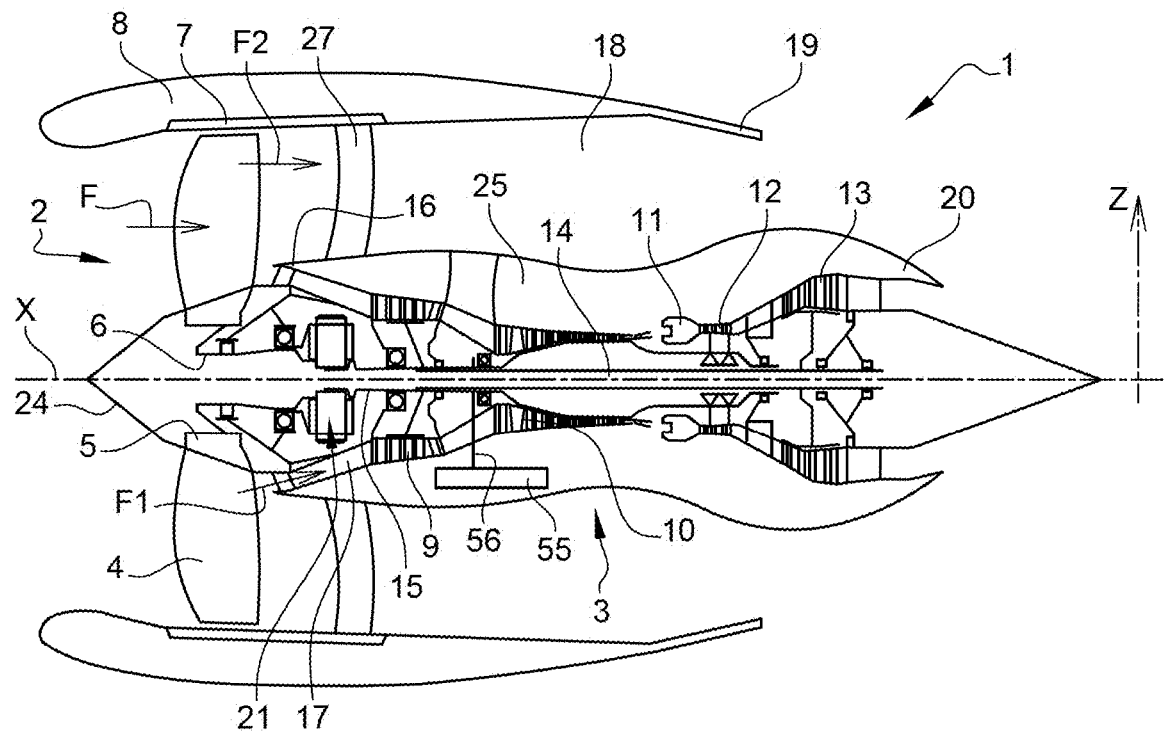
FIG. 1 is a schematic and axial cross-sectional view of a double-flow turbine engine with a reducer according to the invention.

FIG. 1 shows an axial cross-sectional view of a turbine engine 1 of longitudinal axis X to which the invention applies. The turbine engine shown is a double-flow and double-body turbojet engine intended to be mounted on an aircraft according to the invention. Of course, the invention is not limited to this type of turbine engine.

In the present application, the terms "upstream", "downstream", "axial" and "axially" are defined with respect to the flow direction of the gases in the turbine engine and also along the longitudinal axis X (and even from left to right in FIG. 1). The terms "radial," "radially", "internal", and "external" are also defined with respect to a radial axis Z that is perpendicular to the axis X of the turbine engine.

This double-flow and double-body turbojet engine 1 comprises a fan 2 that is mounted upstream of a gas generator or gas turbine engine 3. The fan 2 comprises a plurality of fan vanes 4 that extend radially from the periphery of a disc 5 through which a fan shaft 6 extends. The fan 2 is surrounded by a fan casing 7 which is carried by a nacelle 8 which extends around the gas generator 3 and along the longitudinal axis X.

The gas generator 3 comprises, from upstream to downstream, a low-pressure (LP) compressor 9, a high-pressure (HP) compressor 10, a combustion chamber 11, a high-pressure turbine 12 and a low-pressure turbine 13. The HP compressor 10 is connected to the HP turbine via an HP shaft 14 to form a first body referred to as high-pressure. The LP compressor is connected to the LP turbine via a LP shaft (15) to form a second body referred to as low-pressure. The LP shaft 15 extends inside the HP shaft 14.

An air flow F that enters the turbine engine via the fan 2 is divided by a splitter nose 16 of the turbine engine into a primary air flow F1 that flows through the gas generator 3 and in particular in a primary duct 17, and into a secondary air flow F2 that flows around the gas generator 3 in a secondary duct 18. The primary duct 17 and the secondary duct 18 are coaxial. The secondary air flow F2 is ejected by a secondary nozzle 19 terminating the nacelle 8, while the primary air flow F1 is ejected outside the turbine engine via an ejection nozzle 20 located downstream of the gas generator. The primary and secondary air flows meet at the outlet of their respective nozzles.

Figure 2:
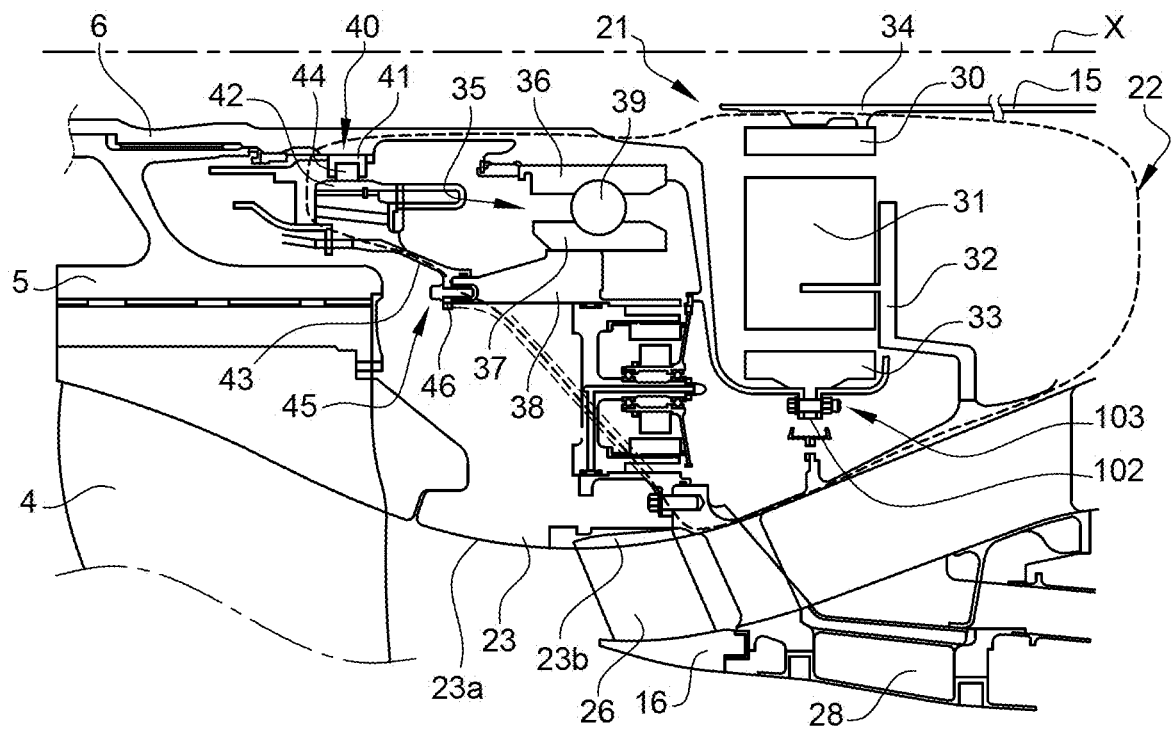
FIG. 2 is a schematic, partial and detail view of a fan module of a double-flow turbine engine with a reducer interposed between a fan shaft and a power shaft of the turbine engine according to the invention.

With reference to FIG. 2, the fan shaft 6 is connected to a power shaft which drives it in rotation about the longitudinal axis X via a power transmission mechanism. In this present example, the power shaft is the low-pressure shaft 15. The power transmission mechanism allows the speed of the fan 2 to be reduced to a lower speed than that of the low-pressure shaft 15. On the other hand, the power transmission mechanism allows the arrangement of a fan with a large diameter in order to increase the bypass ratio. The bypass ratio of the fan is advantageously higher than 10. Preferably, the bypass ratio is between 15 and 20.

The power transmission mechanism comprises a reducer 21, which in this case is a planetary speed reducer. Of course, a planetary gear speed reducer is possible. The reducer is housed in a lubrication enclosure 22 arranged upstream of the gas generator 3. The lubrication enclosure 22 allows to lubricate the speed reducer 21 as well as the rotational guide bearings of the speed reducer and the fan shaft. In particular, the lubrication enclosure 22 is arranged in an annular internal casing 23 which is extended upstream by an aerodynamically shaped inlet cone 24.

The internal casing 23 comprises a first annular ferrule 23*a* that rotates about the longitudinal axis X relative to a second annular ferrule 23*b* of the internal casing 23. The first ferrule 23*a* is mounted on the fan disc 5. The second annular ferrule 23*b* is structurally connected to an inlet casing 28 of the inter-duct casing 25 by first stator vanes 26 (known by the acronym IGV) that extend radially into the primary air flow F1 and around the longitudinal axis X. The inlet casing 28 carries the splitter nose 15 upstream. The fan disc 5 and the first ferrule 23*a* form a rotor assembly. The inlet casing 28, the stator vanes 26 and the second ferrule 23*b* form a stator assembly. Second stator vanes 27 (known as OGV) structurally connect the inlet casing 28 to the fan casing 7 that extend radially into the secondary air flow and around the longitudinal axis.

In FIG. 2, the gear train of the speed reducer 21 typically comprises a sun gear (or internal planetary) 30, a plurality of planet gears 31, a planet carrier 32, and a ring gear (external planetary) 33. In the present example with a planetary reducer, the sun gear 30 is centred on the longitudinal axis X and is rotatably coupled with the LP shaft 15 along the longitudinal axis X via a sun gear shaft 34. The latter comprises first elements (not shown) intended to cooperate with complementary second coupling elements (not shown) carried by the LP shaft 15. The planet gears 31 are carried by the planet carrier 32 and are each guided in rotation about a planet gear axis, here, parallel to the longitudinal axis X. Each planet gear 31 meshes with external toothings of the sun gear 30 and internal toothings of the ring gear 33. The planet carrier 32 is locked in rotation and is secured to a stator casing of the turbine engine. The ring gear 33, centred on the longitudinal axis X, surrounds the sun gear 30 and is coupled in rotation with the fan shaft 6. The sun gear 30 forms the input of the reducer while the ring gear 33 forms the output of the reducer.

In the case of an epicyclic gear train, the planet carrier 32 is coupled in rotation with the fan shaft 6 and the ring gear 33 is secured to a stator casing of the turbine engine. In other words, the ring gear 33 is stationary in rotation. In this way, the sun gear 30 forms the input of the speed reducer while the planet carrier 32 forms the output of the speed reducer.

The fan shaft 6 is guided in rotation with respect to a stationary structure of the turbine engine by means of at least one bearing. A first bearing 35 (here with rollings) comprises an internal ring 36 mounted on the fan shaft 6, an external ring 37 carried by a first annular bearing support 38 and rolling members 39 between the internal and external rings. The rolling members 39 of the first bearing 35 are advantageously balls. The first annular bearing support 38 is secured to the stationary structure of the turbine engine. The bearing 35 is arranged upstream of the speed reducer 21.

The turbine engine also comprises another guide bearing (second bearing) 40 for the rotation of the fan shaft 6 relative to the stationary structure of it. This second bearing 40 (here with rollings) is arranged upstream of the first guide bearing 35. The guide bearing 40 comprises an internal ring 41 mounted on the fan shaft 6 and an external ring 42 mounted on a second bearing support 43. Rolling members 44 are interposed between the internal and external rings. These rolling members 44 comprise rolls. The second bearing support 43 comprises a flange 46 to which the first bearing support 38 is attached. The attachment is done by means of attachment members 45 such as screws and nuts or other members allowing a quick mounting and dismounting.

Figure 3A:
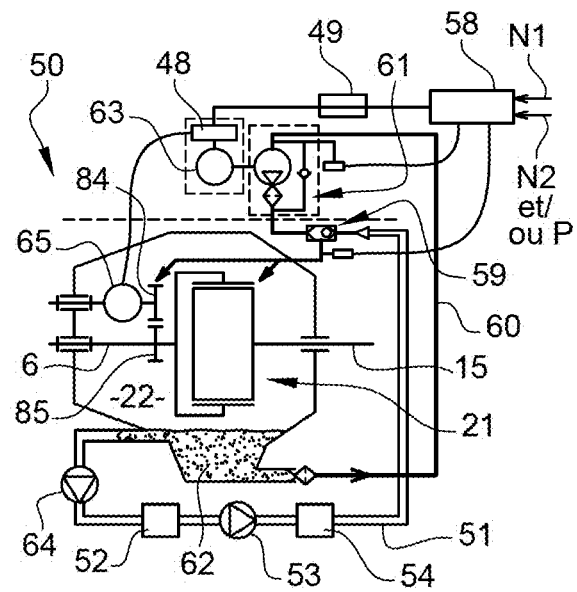
FIG. 3a is a schematic view of a system for lubricating members and equipment of a turbine engine with an active auxiliary pump according to the invention.
Figure 3B:
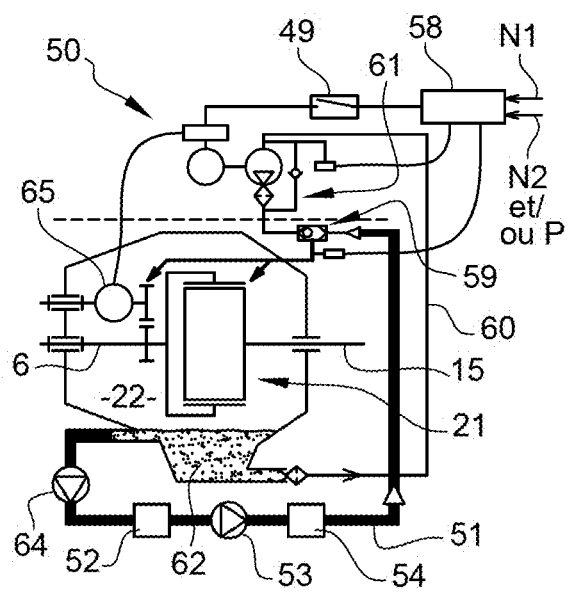
FIG. 3b is a schematic view of a system for lubricating members and equipment of a turbine engine with an inactive auxiliary pump according to the invention.

With reference to FIGS. 3*a* and 3*b*, the turbine engine comprises a lubrication system 50 for certain equipment and members of the turbine engine arranged in lubrication enclosures, such as the speed reducer 21 and the bearings 35, 40, described above. The lubrication system comprises a main circuit 51 that supplies at least the lubrication enclosure 22, described above, in a closed circuit. The main circuit 51 comprises at least one main lubricant supply tank 52 and a main supply pump 53 of the lubricant for allowing the circulation of the lubricant from the tank towards the lubrication enclosure 22. The main circuit 51 also comprises a thermal exchanger 54 which is arranged downstream of the main pump 53 in the direction of lubricant flow in the turbine engine. The main pump 53 is driven by an accessory gear box or relay 55 (AGB). The main pump 53 is advantageously mounted on the accessory gear box 55 (i.e., outside the lubrication enclosure 22).

The accessory gear box 55, shown in FIG. 1, is housed in the turbine engine in an area known as the "core area". The "core area" is located in the inter-duct casing 25 (i.e., between the primary vein 17 and the secondary vein 18). The accessory gear box 55 is driven in rotation by the high-pressure shaft 14 via a radial shaft 56. Alternatively (not shown), the accessory gear box 55 is housed in the nacelle 8 and is driven by the radial shaft 56 then extending into a casing arm that connects the inter-duct casing 25 and the nacelle 8.

In FIGS. 3a, 3b, the main pump 53 communicates with an electronic control unit 58 which is dedicated to the control of certain members and/or equipment of the turbine engine. This electronic control unit 58 can be an EEC calculator (Electronic Engine Controller). The calculator is controlled by a full authority electronic system (known by the acronym FADEC for "Full Authority Digital Engine Control") which manages the correct operation of the turbine engine. The calculator 58 is also connected to means for monitoring the parameters of the high-pressure shaft 14 such as its speed N1, N2 for example and means for detecting the pressure P of the lubricant in the main circuit 51.

The lubrication system 50 (with reference to FIGS. 3a and 3b) also comprises an auxiliary lubrication circuit 60 which is intended to also supply the lubrication enclosure 22, in a closed circuit. This auxiliary circuit 60 comprises an auxiliary lubricant supply pump 61 that is powered by electrical energy. This auxiliary pump 61 is connected on the one hand to an auxiliary oil tank 62 and on the other hand to the lubrication enclosure 22. The auxiliary pump 61 is arranged upstream of the lubrication enclosure 22 along the flow direction of the lubricant in the auxiliary circuit. Advantageously, the auxiliary tank 62 is an oil accumulation area that recovers oil. This one is at the bottom of the enclosure 22 (at six o'clock by analogy with the dial of a clock).

Typically, each lubrication enclosure in the turbine engine also comprises a lubricant recovery pump 64 that returns the lubricant from a recovery tank (or accumulation area) towards the main supply tank. The auxiliary pump 61 is electric and is driven by an electric motor 63. Advantageously, the auxiliary pump 61 and the electric motor 63 are arranged outside the lubrication enclosure 22 so as to unclutter the lubrication enclosure and keep them away from this constrained, lubricant-bathed environment.

The main pump 53 is ignited (or activated) as soon as the high-pressure shaft 14 rotates at a predetermined rotational speed N2 and/or a predetermined pressure P is reached in the main circuit 51 so as to allow the circulation of the lubricant from the main tank 51 into the lubrication enclosure 22. This operating mode takes place after the turbine engine has been started and during flight. The auxiliary pump 61 is inactive and the auxiliary circuit 60 is not supplied with lubricant.

The turbine engine 1 further comprises an electric machine 65 that comprises a rotor and a stator so as to benefit from an additional electrical power, in particular to power the electric motor 63 of the auxiliary pump 61. The electric machine 65 operates advantageously, but not restrictively, as a motor, i.e. it allows the conversion of mechanical energy into electrical energy. For this purpose, the electric machine 65 is coupled with the fan shaft 6 which provides it with mechanical power during its rotation and which will be converted into electrical power. The fan shaft 6 is driven in rotation by the LP shaft 15 as soon as the HP shaft 14 rotates or when the wind acts on the blades of the fan vanes. In other words, this additional electrical power will be available whatever the operation of the turbine engine, i.e., in case of wind milling (autorotation of the fan on the ground or at standstill), during flight, during the landing phase and during start-up. The lubrication system of the reducer in the lubrication enclosure 22 (where the speed reducer is located) is thus autonomous.

Of course, the electric machine 65 could operate in a generator mode so as to convert electrical energy into mechanical energy.

The electric machine 65 is electrically connected to an electric relay case 48 which is configured so as to enable or disable the electrical power to the electric motor 63 of the auxiliary pump 61. These electric relays 48 are themselves electrically connected to the calculator 58. These electric relays cooperate with at least one switch (or flap) 49 configured to occupy an open position or closed position.

FIG. 3a shows the turbine engine turned off. In this case, we consider that the calculator 58 is inactive. By default, the relay case is closed and the switch 49 is in the closed position. The rotation of the fan shaft allows the electric machine 65 to generate electrical power which then powers the electric motor 63 of the auxiliary pump 61. Also, the main pump is "de-primed" and the oil circulation in the main circuit 51 is interrupted. This is made possible by a flap 59 that is installed at least between the auxiliary pump 61 and the enclosure 22. The flap is also located between the two circuits and the enclosure. In particular, the flap 59 allows for two inlet orifices and one outlet orifice. A first inlet orifice is connected to the auxiliary circuit 60 and a second inlet orifice is connected to the main circuit 51. The flap 59 further comprises a shutter element, such as a ball, for shuttering one of the inlet orifices as a function of the pressure in the circuits. By activating the auxiliary pump 61, the oil is pumped into the auxiliary tank 62 and in particular from the bottom thereof. The pressure in the auxiliary circuit 60 increases until it reaches a pressure that will cause the inlet of the main circuit 51 to be shuttered and prevent the lubricant from flowing through it towards the enclosure 22. The lubricant flows through the auxiliary circuit and towards the enclosure 22.

With reference to FIG. 3b, the turbine engine is turned on. In this case the calculator 58 is active and can drive the relay box 48. The switch 49 is in the open position. When the calculator 58 receives an information indicating that the high-pressure shaft is rotating at a speed at least equal to the predetermined speed N1 or N2 and/or that the pressure in the circuit reaches the predetermined pressure P in the main circuit, the calculator 58 deactivates the relay case 48 (a control command is sent to the relay case 48). In this way the main circuit is operational. The oil is pumped from the auxiliary tank (via the main tank among others) and from an outlet which is connected to the main circuit. This oil outlet connected to the main circuit is located radially inside the oil outlet connected to the auxiliary circuit. The increased pressure in the main circuit causes the inlet to the auxiliary circuit 60 to become shuttered, preventing lubricant from flowing towards the enclosure 22. The lubricant flows through the main circuit 51 and towards the enclosure 22. There is no electrical current produced. The electric machine does not transmit electrical power to the auxiliary pump (there is no current).

Figure 4:
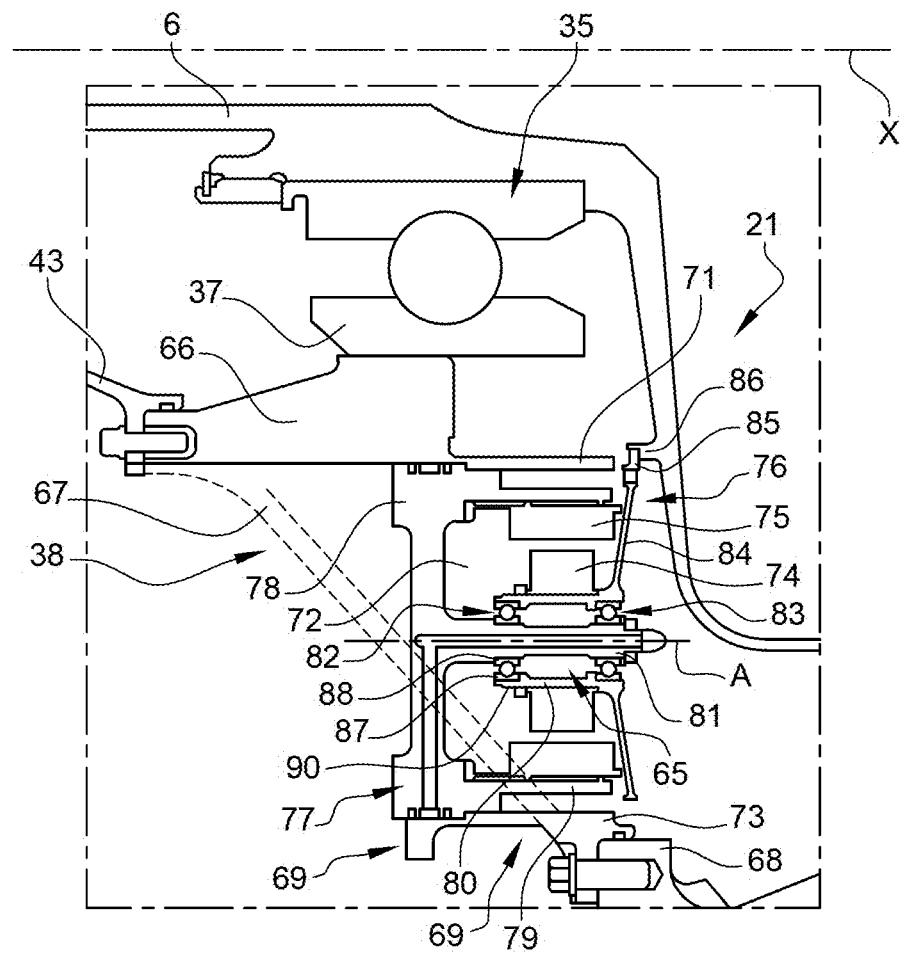
FIG. 4 is an embodiment of an arrangement of an electric machine cooperating with a fan shaft in a turbine engine module according to the invention.

With reference to FIG. 4, the electric machine 65 is carried by the bearing support 38 which is upstream of the speed reducer 21. In other words, the electric machine 65 is arranged in the lubrication enclosure 22 so that it can be cooled by the lubricant. The maximum temperature in the lubrication enclosure 22 is about 150° C., which is quite acceptable for the electric machine 65. The temperature of the components of the electric machine 65 (electrical conductors, electrical insulators, magnetic circuit, temperature sensors, exciter) should generally not exceed this value. In addition, it generates high power which is directly discharged into the lubricating fluid. The lubrication enclosure 22 (shown partly as a dashed line in FIG. 2) is delimited at least partly by the first and second bearing supports 38, 43 and a segment of the internal casing 23. A portion of the fan shaft 6 may also delimit the lubrication enclosure depending on the configuration. Advantageously, the lubricant that occupies the lubrication enclosure 22 is oil in mist form. In this lubrication enclosure, the connection between the electric machine 65 and the fan shaft 6 is facilitated. Furthermore, the electric machine 65 is also arranged upstream of the speed reducer 21 where the space is available for its installation.

The bearing support 38 comprises a first substantially cylindrical segment 66 to which the external ring 37 of the guide bearing 35 in rotation of the fan shaft 6 is secured. The bearing support 38 comprises a second, substantially frustoconical segment 67 which is connected, on the one hand, to the first segment 66, and on the other hand, to the stationary structure 68 of the turbine engine. The first segment 66 extends radially inward from the second segment 67. The first segment 66 is integral with the second segment 67.

With reference to FIGS. 4 to 7, the bearing support 38 comprises a case 69 that is intended to house or carry at least one portion of the electric machine 65. In particular, the second segment 67 comprises a recess 47 with a bottom 70 (see FIG. 6) that is provided on the upstream side of the bearing support 38. The bottom 70 is defined in a plane that is perpendicular or substantially perpendicular to the longitudinal axis X. The bottom 70 is extended downstream by a substantially cylindrical skirt 71 with an axis parallel to the longitudinal axis. The skirt 71 delimits a through cavity 72 that opens at the level of the bottom 70 (upstream of the second segment 67) of the recess 47. In other words, the bottom 70 comprises a first opening with an axis parallel to the longitudinal axis and the free end 73 of the skirt 71 delimits a second opening through which the cavity 72 also opens downstream.

The rotor 74 is connected (indirectly) to the fan shaft 6 so as to be driven in rotation about an axis of rotation A parallel to the longitudinal axis X with respect to the stator 75 which is mounted on a stationary element. The connection of the rotor 74 and the fan shaft 6 is realized by a motion take-off mechanism 76 that allows the transmission of the motion from the fan shaft 6 to the electric machine 65. In other words, the motion take-off mechanism is arranged (kinematically) between the rotor of the electric machine and the fan shaft. The electric machine 65 also comprises a basement (or support) 77 that supports at least the rotor 74, the stator 75 or the motion take-off mechanism 76.

As can be seen in FIG. 4, the basement 77 comprises a base plate 78 from which a substantially cylindrical annular wall 79 extends. The annular wall 79 extends axially within the skirt 71 of the bearing support 38 (or the case 69). The basement 77 is attached to the bottom 70 of the case 69, on the upstream side of the bearing support 38, by means of attachment members. The latter are of the type of screw, nut, or any element allowing a quick dismounting and/or mounting without damaging the electric machine 65. Advantageously, the stator 75 is arranged on a radially internal face of the annular wall 79. The bottom 70, the skirt 71 and the basement 77 form the case 69 of the electric machine 65.

The motion take-off mechanism 76 of the electric machine 65 comprises a drive shaft 80 of axis of rotation A (parallel to the longitudinal axis X and coaxial with the rotor axis) which is driven in rotation by the fan shaft 6. The drive shaft 80 is carried by a central finger 81 which is secured to the base plate 78 and is coaxial with the axis of rotation A of the drive shaft. The drive shaft 80 is hollow and the finger 81 extends into it. Guide bearings, designated first rotor bearing 82 and second rotor bearing 83, allow the drive shaft 80 to be guided relative to the basement 77 (and more specifically the finger 81). The drive shaft 80 is freely mounted in rotation about the axis of rotation A.

The motion take-off mechanism 76 comprises a toothed wheel 84 that is coupled at one end to the drive shaft 80. The toothed wheel 84 is coaxial with the axis of rotation A of the drive shaft 80. The toothed wheel 84 is arranged downstream of the free end 73 of the skirt 71 of the case and also that of the annular wall 79. The toothed wheel 84 is intended to mesh with a toothed ring gear 85 which is secured in rotation to the fan shaft 6. We understand that the motion take-off mechanism comprises a gear train.

This configuration of the motion take-off mechanism reinforces the modular character of the electric machine and the motion take-off, as well as the easy dismounting and mounting from the upstream of the turbine engine for possible maintenance operations. The space upstream of the speed reducer allows the integration of the motion take-off mechanism.

For this purpose, the fan shaft 6 comprises a protruding element 86 which extends axially from the wall of the fan shaft 6 and to which the toothed ring gear 85 is attached. In particular, the toothed ring gear 85 is shrunk onto the fan shaft 6 and an axial pin (not shown) allows it to be held in position. In an alternative configuration (not shown), the toothed ring gear is integral with the fan shaft 6. The toothed ring gear 85 is coaxial with the fan shaft 6 (i.e., the longitudinal axis X).

In this embodiment, the drive shaft 80 is integral with the toothed wheel 84. The rotor 74 is mounted on the drive shaft 80 so that when the fan shaft 6 rotates, the rotor 74 also rotates relative to the stator 75. Here, the stator 75 of the electric machine 65 extends around the rotor 74 of the electric machine 65.

The first rotor bearing 82 is arranged upstream of the rotor 74 while the second rotor bearing 83 is arranged downstream of the rotor 74. Each of the first and second rotor bearings 82, 83 comprises, respectively, a first ring secured to the drive shaft 80 and a second ring secured to a stationary element. In the case of FIG. 4, the first ring is the external ring 87 and the second ring is the internal ring 88 which is attached to the basement 77 (in particular, the finger 81) of the electric machine 65. The first bearing and the second bearing of rotor 82, 83 are rolling bearings. The first and second bearings also have the same diameter. Alternatively, the diameters can be different. The rolling members of the first and second bearings comprise balls or rolls respectively.

Figure 5:
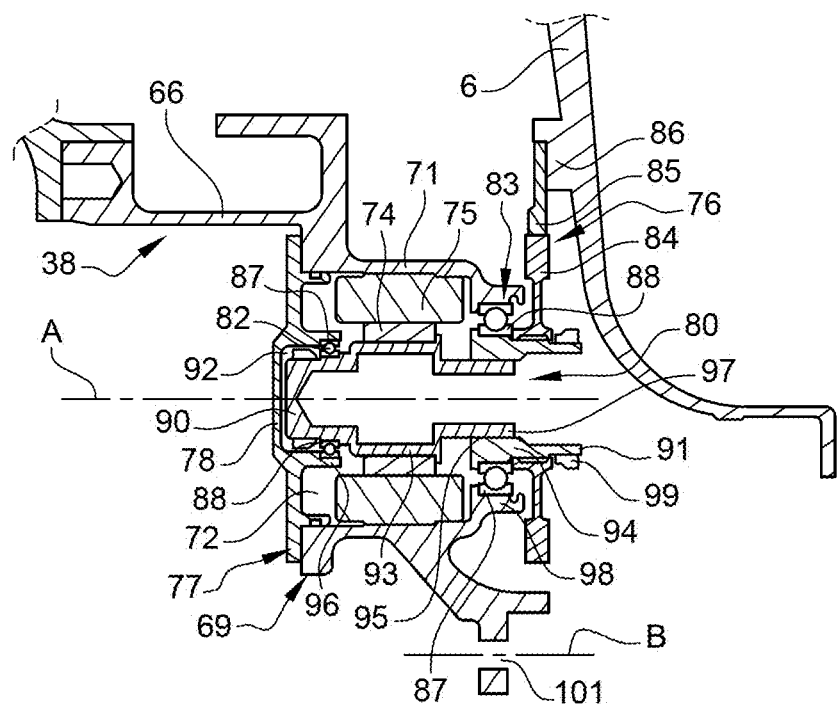
FIG. 5 is another embodiment of an arrangement of an electric machine cooperating with a fan shaft in a turbine engine module according to the invention.

FIG. 5 illustrates another embodiment of the electric machine 65. The numerical references are retained for the elements that are identical or substantially identical and/or have the same function. In this example embodiment, the stator 75 is mounted on the bearing support 38 and the rotor 74 is mounted on the drive shaft 80 of the electric machine. The drive shaft 80 rotates freely about the axis of rotation A and relative to the basement 77 of the electric machine 65 by means of at least one guide bearing in rotation. The axis of rotation A is substantially parallel to the longitudinal axis X. Its proximal end 90 is rotatably guided by the first rotor bearing 82 in a reception housing 92 of the basement 77 and its distal end 91 is coupled to the toothed wheel 84.

In particular, in this embodiment, the drive shaft 80 comprises a first segment 93 and a second segment 94 that are rotationally secured. The first segment 93 carries the proximal end 90 and the second segment 94 carries the distal end 91. The first segment 93 comprises (towards its free end 97) splines 95 on its radially external surface and which engage with corresponding splines formed on the radially internal surface of the second segment 94. In this way, the first segment 93 and the second segment 94 of the drive shaft 80 are rotationally secured. The reception housing 92 is delimited by an annular partition 96 whose axis is coaxial with the axis of rotation A of the drive shaft 80 and which is secured to the base plate 78. The annular partition 96 extends upward from an internal surface of the base plate 78.

The first rotor bearing 82, arranged upstream of the rotor 74, comprises a first ring (here, the internal ring 88) secured to the drive shaft 80 and a second ring (here, the external ring 87) secured to the wall of the annular partition 96. The free end 97 of the first segment 93 extends inside the second segment 94. The second rotor bearing 83 is arranged, axially downstream of the rotor 74, and radially between the bearing support 38 and the second segment 94 of the drive shaft 80. The first ring (here, the internal ring 88) of the second rotor bearing 83 is integral with the drive shaft 80 and the second ring (here, the external ring 87) is secured to the bearing support 38. In particular, the stator 75 is mounted on the annular skirt 71 of the case of the bearing support. The free end of the skirt 71 comprises an annular neck 98 that carries the external ring 87 of the second rotor bearing 83. In this example embodiment, the second rotor bearing 83 has a larger diameter than the first rotor bearing 82.

As can also be seen in FIG. 5, the toothed wheel 84 is coupled to the second segment 94 of the drive shaft 80. As in the first embodiment, the toothed wheel 84 meshes with the toothed ring gear 85 attached to the protruding element 86 of the fan shaft 6 (or which is made integral with the fan shaft 6). The toothed wheel 84 is axially arranged between the internal ring 88 of the second rotor bearing 83 and an attachment element 99 (in this case a nut) to hold it to the second segment 94 of the drive shaft 80.

Figure 6:
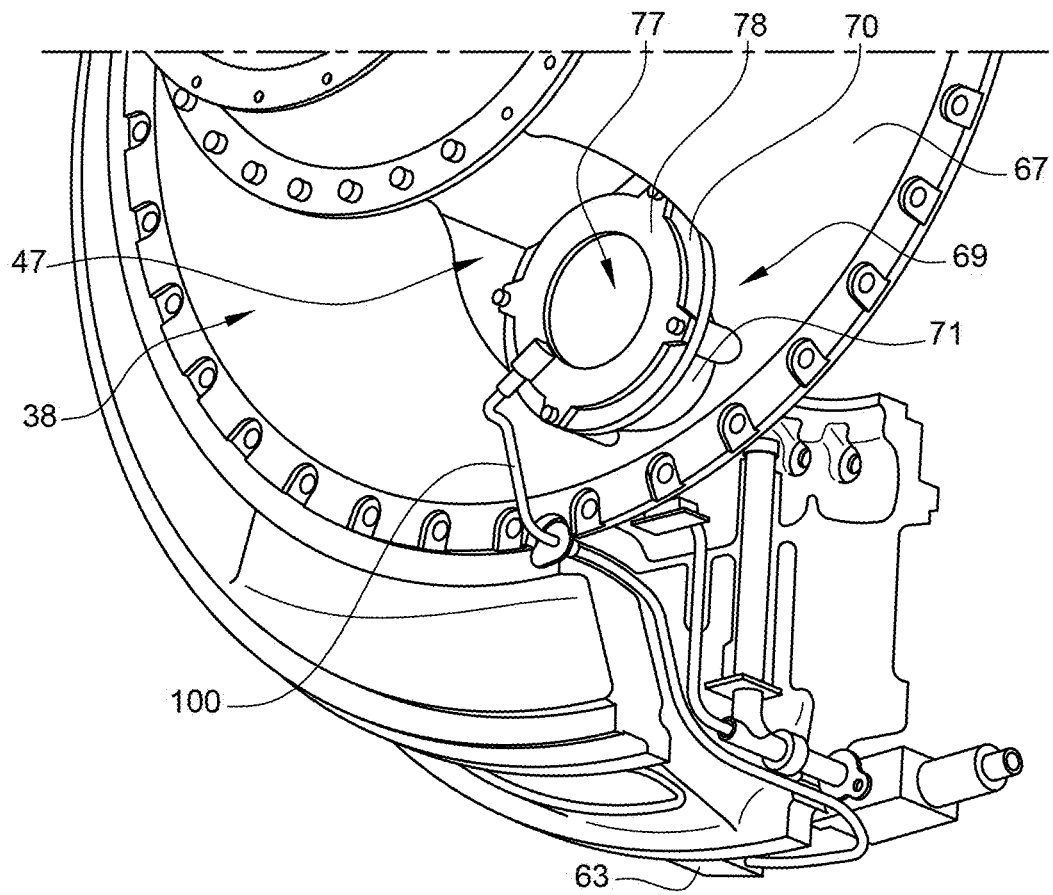
FIG. 6 shows the upstream of an example of a bearing support of a guide bearing of a fan shaft of a turbine engine, the bearing support carrying an electric machine according to the invention.

With reference to FIG. 6, the electric machine 65 comprises at least one electric cable 100 for transmitting the electrical power to the auxiliary pump 61. The electric cable 100 extends outside the lubrication enclosure 22, which prevents it from coming into contact with an oil-bathed environment. The electric cable 100 is advantageously connected (directly or indirectly) to the stator 75 and passes through an orifice 101 (shown in FIG. 5) in the base plate 78 of the support 77 of the electric machine 65. The orifice 101 has an axis B parallel to the longitudinal axis X. On the other hand, the cable 100 is connected to the electric motor 65.

The electric machine 65 is configured so as to facilitate its mounting and dismounting. During the mounting or assembling of the module of the turbine engine, and in particular the fan module, the speed reducer 21 is first assembled with its various components by sliding it from upstream to downstream so that the sun gear 30 is coupled to the low-pressure shaft 15. The fan shaft 6 is attached to radial flanges 102 (shown in FIG. 2) of the ring gear 33 by means of attachment members 103 (shown in FIG. 2). These attachment members may comprise screws, nuts, bolts, studs or other suitable elements to facilitate dismounting and/or mounting. The bearing 35 (with its internal and external rings) is mounted on the fan shaft 6. The bearing 40 (with its internal and external rings) is also mounted on the fan shaft 6 (advantageously after the bearing 35 has been mounted). Beforehand, the bearing 35 is mounted on the first bearing support 38. The latter is then attached on a stationary structure of the turbine engine. The bearing 35 is then tightened to the fan shaft 6 using a nut, for example. The first and second bearing supports 38, 43 are attached together. Similarly, the bearing 40 is mounted on the second bearing support 43 before it is attached to the first bearing support 38.

The electric machine 65 (with its rotor 74, stator 75, drive shaft 80 and bearings 82, 83, etc.) is assembled and then arranged in the case 69 (made in the bearing support 38). More specifically, the rotor 74 is mounted on the drive shaft 80 of the basement 77. The stator 75 is mounted on the stationary element supporting at least partly the electric machine, either on the basement 77 of the case of the electric machine 65 (specifically the annular wall 79) (embodiment of FIGS. 2 and 4), or on a wall of the case of the electric machine (specifically the cylindrical skirt 71 of the first bearing support 38) (embodiment of FIG. 5).

Advantageously, the toothed ring gear 85 is attached to the fan shaft 6 before the electric machine 65 with the toothed wheel 84 is inserted into the case 69. The basement 77 is then attached to the first support 38 so that the rotor 74 and the stator 75 are arranged in the case 69 of the first bearing support 38, which is open in the lubrication enclosure 22. In this way, when the latter is engaged in the case 69, the toothed wheel 84 (carried by the drive shaft 80) meshes with the toothed ring gear 85. The base plate 78 of the basement 77 is screwed to the bottom 70 of the case 69.

The dismounting is realized by performing the steps in reverse.

The electric cable 100 is connected to the electric machine 65 and the auxiliary pump 61.

The disc 5 is then inserted from upstream of the internal casing to couple it to the fan shaft 6. Finally, the inlet cone 24 is mounted on the internal casing to close the fan module.

In the scope of the embodiment shown in FIG. 5, at least one portion of the motion take-off mechanism 76 is installed on the fan shaft 6 after the fan shaft 6 is installed. In particular, the toothed ring gear 85 is mounted on the fan shaft 6 and is attached to it. The toothed ring gear 85 can be made integral with the fan shaft 6 as described above. The toothed wheel 84 (previously attached to the second segment 94 of the drive shaft 80) is arranged so as to mesh with the toothed ring gear 85. The second rotor bearing 83 (with its internal and external rings) is also secured to the second segment 94 of the drive shaft 80. The first and second bearing supports 38, 43 are mounted in the turbine engine with their respective bearings 35, 40. The electric machine 65 is assembled and arranged in the case 69 of the electric machine 65. In particular, the rotor 74 is mounted on the drive shaft 80 of the basement 77 and the stator 75 is mounted on the case of the electric machine (specifically, on the cylindrical skirt 71 of the first bearing support 38). Next, the first segment 93 of the drive shaft 80 with the rotor 74 and the first rotor bearing 82 (internal ring and external ring) mounted thereon is inserted into the case of the bearing support from upstream to downstream. During this insertion, the splines of the first segment 93 of the drive shaft 80 slidably engage the corresponding splines of the second segment 94 of the drive shaft 80. The base plate 78 of the support 7 is then screwed to the bottom 70 of the case.

Upon dismounting the motion take-off mechanism 76, according to this embodiment of FIG. 5, the toothed ring gear 85, the toothed wheel 84, the bearing 83 (with its internal and external rings), the nut 99, and the second segment 94 of the drive shaft 80 remain permanently on the fan shaft 6. By disconnecting the first segment 93 of the fan shaft 6 from the second segment 94 by means of the splines, the base plate 78, the bearing 82 (with its internal and external rings) and the rotor 74 are dismounted simultaneously. The stator 75 can then be removed as well. The bearing supports 38, 43 are then dismounted, along with the fan shaft 6.

The invention claimed is:

1. A turbine engine module comprising:
   a lubrication enclosure,
   a first bearing support,
   a fan shaft guided in rotation about a longitudinal axis by at least one first guide bearing mounted on the first bearing support which is attached to a stationary structure of the turbine engine,
   a power shaft driving the fan shaft in rotation by means of a speed reducer arranged in a lubrication enclosure,
   a lubrication system for at least the speed reducer comprising a closed main circuit for supplying the lubrication enclosure, and a closed auxiliary circuit for supplying the lubrication enclosure when the main circuit is inactive, the auxiliary circuit comprising at least one auxiliary supply pump driven by an electric motor,
   an electric machine configured so as to power the electric motor of the at least one auxiliary pump,
   the electric machine is carried at least partly by the first bearing support and in that the electric machine comprises a rotor connected to the fan shaft so as to be driven in rotation about an axis of rotation parallel to the longitudinal axis and a stator mounted on a stationary element supporting at least partly the electric machine,
   a motion take-off mechanism configured so as to connect the rotor of the electric machine to the fan shaft and to transmit the motion from the fan shaft to the rotor,
   wherein the motion take-off mechanism comprises a toothed wheel, and a drive shaft mounted so as to rotate freely about the axis of rotation and on which the rotor is mounted, the drive shaft being coupled to the toothed wheel intended to mesh with a toothed ring gear secured to the fan shaft and being configured so that to be driven in rotation par the fan shaft when the fan shaft is driven in rotation during any conditions of free rotation to drive in rotation the rotor of the electric machine powering the at least one auxiliary pump,
   wherein the rotor of the machine electric is arranged radially outside the drive shaft,
   wherein the drive shaft is guided in rotation by a first rotor bearing and a second rotor bearing, the first rotor bearing being arranged upstream of the rotor of the electric machine and the second rotor bearing being arranged downstream of the rotor of the electric machine.

2. The turbine engine module according to claim 1, wherein the first rotor bearing comprises a first ring secured to the drive shaft and a second ring secured to the stationary element.

3. The turbine engine module according to claim 2, wherein the second rotor bearing comprising a first ring secured to the drive shaft and a second ring secured to the stationary element.

4. The module according to claim 3, wherein the second rotor bearing has a larger diameter than the first rotor bearing.

5. The module according to claim 2, wherein the second rotor bearing has a larger diameter than the first rotor bearing.

6. The turbine engine module according to claim 1, wherein the electric machine is arranged upstream of the speed reducer with respect to the longitudinal axis and at least partly in the lubrication enclosure.

7. The turbine engine module according to claim 1, wherein the electric machine is housed in a case formed in the first bearing support.

8. The module according to claim 7, wherein the bearing support comprises a first substantially cylindrical portion on which is secured an outer ring of the rotational guide bearing of the fan shaft and a second portion substantially frustoconical which is connected to the first portion, and to the stationary structure of the turbine engine.

9. The turbine engine module according to claim 1, wherein the stationary element is a basement of the electric machine mounted on the first bearing support or the stationary element is the first bearing support.

10. The turbine engine module according to claim 1, wherein the drive shaft is integral with the toothed wheel.

11. The turbine engine module according to claim 1, wherein the stator of the electric machine extends around the rotor of the electric machine.

12. The turbine engine module according to claim 1, wherein an electric cable is connected to the electric machine and the electric motor, the electric cable circulating outside the lubrication enclosure.

13. The turbine engine module according to claim 1, wherein the motion take-off mechanism comprises a gear train.

14. The turbine engine module according to claim 1, wherein the at least one auxiliary pump which is installed outside the lubrication enclosure.

15. An aircraft turbine engine comprising the turbine engine module according to claim 1.

16. A method for assembling a turbine engine module according to claim 1, wherein the method comprises the following steps:
   mounting the toothed ring gear on the fan shaft,
   assembling the electric machine by mounting the rotor on the drive shaft and the stator on the stationary element supporting at least partly the stator,
   attaching a basement of the electric machine to the first bearing support in such a way that the rotor and the stator are arranged in a case of the first bearing support which is open in the lubrication enclosure, and
   connecting an electric cable to the electric machine and to at least one auxiliary pump which is installed outside the lubrication enclosure.

17. The module according to claim 1, wherein the at least one auxiliary pump is connected to an auxiliary oil tank and to the lubrication enclosure.

18. The module according to claim 1, wherein the lubrication system comprises a valve which is configured to occupy an open position or a closed position and which is located between the main circuit and the auxiliary circuit, and the lubrication enclosure, the valve comprising a first inlet orifice connected to the auxiliary circuit, a second inlet orifice connected to the main circuit, a shutter element intended to shut off one of the first and second inlet orifices depending on a pressure in the main circuit and in the auxiliary circuit, and an outlet orifice connected to the lubrication chamber, the auxiliary circuit and the main circuit being connected to the bottom of an auxiliary tank.

19. The module according to claim 1, wherein the main circuit comprises a main pump communicating with an electronic control unit connected to electrical relays which is configured so as to authorize or prohibit an electric supply of the electric motor of the at least one auxiliary pump, the electric relays cooperating with at least one valve.

20. The module according to claim 1, wherein said conditions of free rotation of the fan shaft being when the aircraft is on the ground and when the turbine engine is stopped, when the machine is started or ventilated.

21. The module according to claim 1, wherein the toothed wheel has a diameter larger than the diameter of the rotor of the electric machine.

22. The module according to claim 1, wherein the stator of the electric machine is arranged radially outside the rotor of the electric machine.

23. A turbine engine module comprising:
 a lubrication enclosure,
 a first bearing support,
 a fan shaft guided in rotation about a longitudinal axis by at least one first guide bearing mounted on the first bearing support which is attached to a stationary structure of the turbine engine,
 a power shaft driving the fan shaft in rotation by means of a speed reducer arranged in a lubrication enclosure,
 a lubrication system for at least the speed reducer comprising a closed main circuit for supplying the lubrication enclosure, and a closed auxiliary circuit for supplying the lubrication enclosure when the main circuit is inactive, the auxiliary circuit comprising at least one auxiliary supply pump driven by an electric motor,
 an electric machine configured so as to power the electric motor of the at least one auxiliary pump,
 the electric machine is carried at least partly by the first bearing support and in that the electric machine comprises a rotor connected to the fan shaft so as to be driven in rotation about an axis of rotation parallel to the longitudinal axis and a stator mounted on a stationary element supporting at least partly the electric machine,
 a motion take-off mechanism configured so as to connect the rotor of the electric machine to the fan shaft and to transmit the motion from the fan shaft to the rotor,
 wherein the motion take-off mechanism comprises a toothed wheel, and a drive shaft mounted so as to rotate freely about the axis of rotation and on which the rotor is mounted, the drive shaft being coupled to the toothed wheel intended to mesh with a toothed ring gear secured to the fan shaft and being configured so that to be driven in rotation par the fan shaft when the fan shaft is driven in rotation during any conditions of free rotation to drive in rotation the rotor of the electric machine powering the at least one auxiliary pump,
 wherein the first bearing support comprises a first portion on which at least one first bearing is mounted and a second portion which is frustoconical, the second portion being linked to the first portion and to the stationary portion,
 wherein the second portion comprises a recess with a bottom and a cavity extending downstream the bottom and opening in an aperture of the bottom,
 the electric machine being arranged inside the cavity, the electrical machine comprising a basement attached to the bottom and mounted inside the recess.

* * * * *